J. F. PRIBNOW.
SWAGE SHAPER.
APPLICATION FILED OCT. 31, 1912.
1,078,377.
Patented Nov. 11, 1913.
2 SHEETS—SHEET 1.
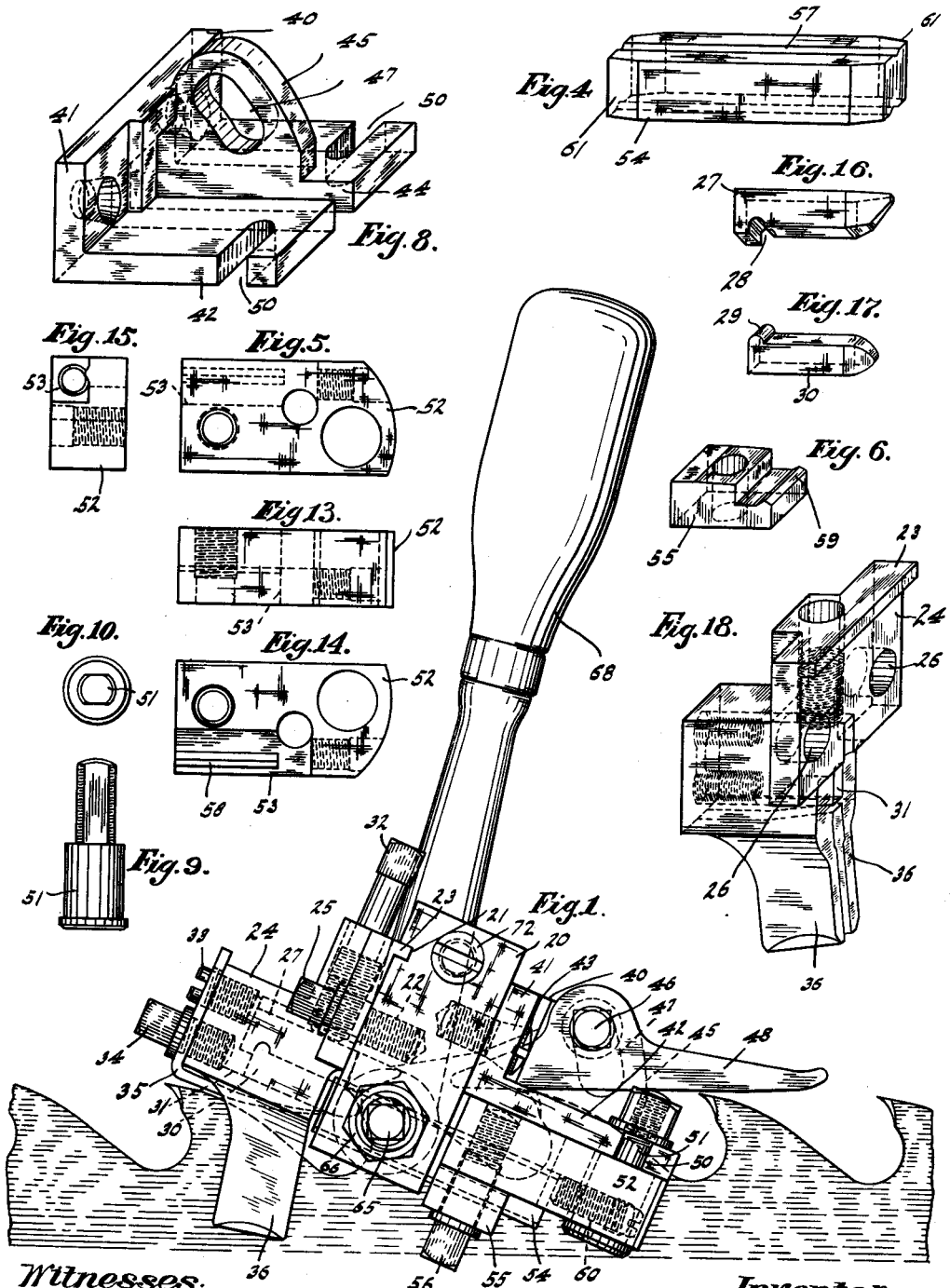
Witnesses:
Frank A. Sable
Josephine Gasper
Inventor:
John F. Pribnow.
Per: Austin M. O'Cook
Attorney.

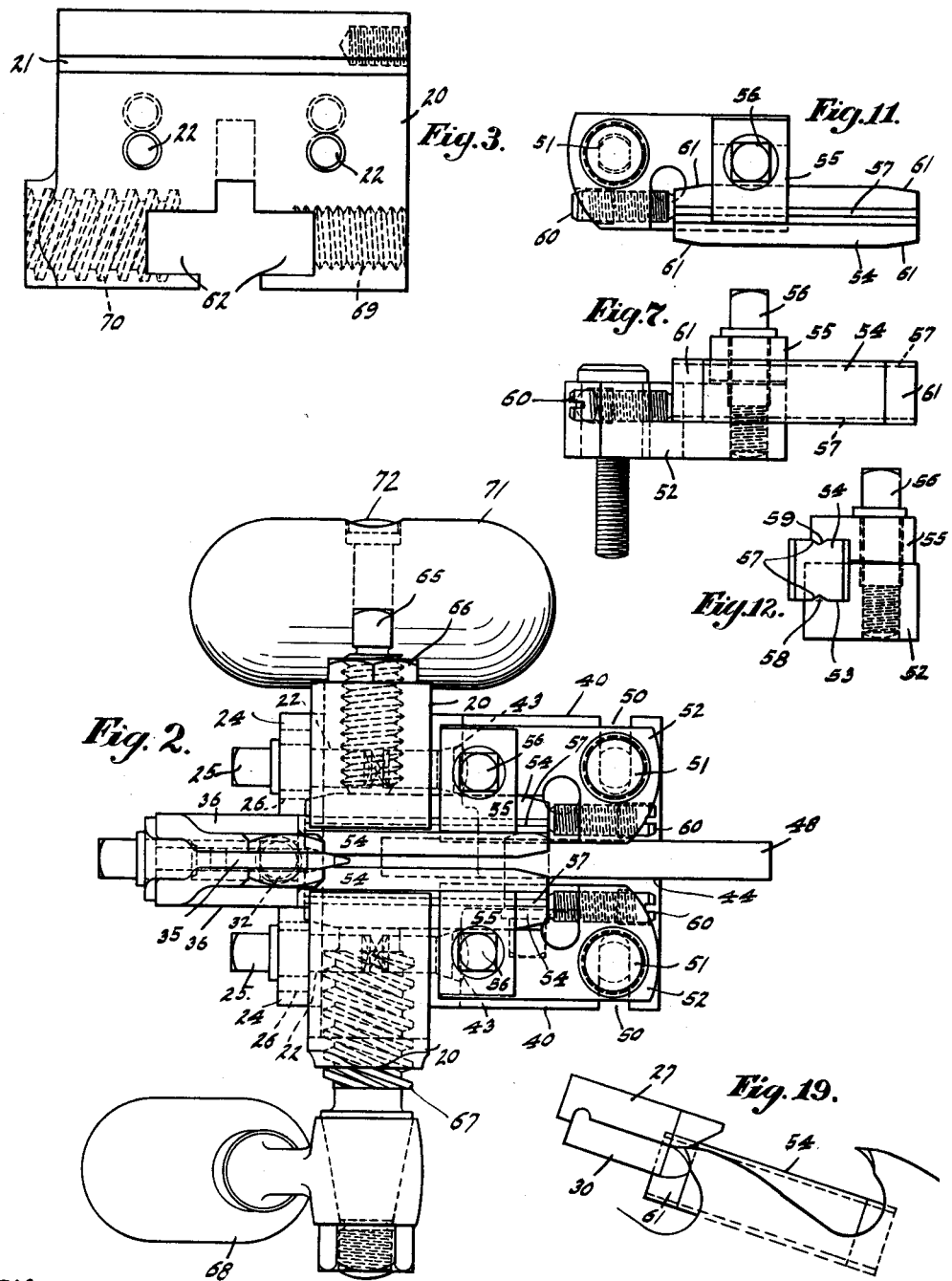

UNITED STATES PATENT OFFICE.

JOHN F. PRIBNOW, OF MELLEN, WISCONSIN.

SWAGE-SHAPER.

1,078,377.  Specification of Letters Patent.  Patented Nov. 11, 1913.

Application filed October 31, 1912. Serial No. 728,786.

*To all whom it may concern:*

Be it known that I, JOHN F. PRIBNOW, a citizen of the United States, residing at Mellen, in the county of Ashland and State of Wisconsin, have invented a new and useful Swage-Shaper, of which the following is a specification.

It is the object of my invention to provide a tool by which swaged saw teeth may be shaped quickly and accurately, and which is compact in construction, easily operated, readily adjustable to all forms of teeth, and inexpensive to manufacture and maintain.

The accompanying drawings illustrate my invention.

Figure 1 is a side elevation of a swage shaper embodying my invention, with the side lifting handle removed; Fig. 2 is a bottom view of the swage shaper of Fig. 1; Fig. 3 is a front elevation of the shaper body; Fig. 4 is a detail perspective of one of the shaper jaws; Fig. 5 is a plan of one of the jaw holders; Fig. 6 is a perspective of one of the jaw holder clamps; Fig. 7 is a side elevation of a shaper jaw clamped in its pivotally mounted jaw holder, the whole being in inverted position; Fig. 8 is a perspective of the shaper jaw bracket; Fig. 9 is an elevation of one of the jaw holder pivot screws; Fig. 10 is an end view of the pivot screw shown in Fig. 9; Fig. 11 is a plan of the parts shown in Fig. 7; Fig. 12 is an end view of the parts shown in Figs. 7 and 11; Fig. 13 is a side elevation of the shaper jaw holder of Fig. 5; Fig. 14 is a bottom view of the shaper jaw holder of Fig. 5; Fig. 15 is an end view of the shaper jaw holder of Fig. 5; Fig. 16 is a detail perspective of the upper part of the tooth gage; Fig. 17 is a detail perspective of the lower part of the tooth gage; Fig. 18 is a detail perspective of the tooth gage holder; and Fig. 19 is a diagrammatic side view showing one of the shaper jaws and the tooth gage in position on the saw teeth.

The shaper body 20 has a transverse groove 21 and two screw holes 22 on its front face, the groove 21 receiving a transverse ridge 23 of a gage holder 24 and the holes 22 receiving shouldered bolts 25 which pass through holes 26 in said tooth gage holder, said holes 26 being elongated in a direction parallel to the ridge 23. The distance between the shoulders of the bolts 25 is sufficient to allow the tooth gage holder to slide freely horizontally relatively to the shaper body 20. The tooth gage comprises two parts, the upper part 27 being transversely grooved at 28 to receive a tongue 29 on the lower part 30; the two parts are put together as shown in Fig. 19, and are properly shaped at one end to fit against the back and the face of the swaged saw tooth and properly tapered laterally to give the swaged sides of such saw tooth the proper shape. The tooth gage is mounted in a slot 31 in the tooth gage holder, being clamped in proper adjusted position therein by screws 32 and 33 taking in threaded holes in the tooth gage holder. A bolt 34 clamps to the gage tooth holder a shield finger 35 which extends under the tooth gage and serves to protect the saw tooth and to take the wear as the device is slid from tooth to tooth. The lower part of the tooth gage holder is bifurcated to form prongs 36, which straddle the saw when the swage shaper is being used.

A shaper jaw bracket 40, having two flanges 41 and 42 at right angles to each other, is clamped to the back of the shaper body 20 by clamping screws 43, such bracket being slotted at 44 so that it can straddle the saw. Clamped to a web 45 extending between the flanges 41 and 42, by a bolt 46 extending through a slot 47 in said web, is a guide 48, which rests on one or more of the saw teeth and may be adjusted to suit the device to the saw. The two sides of the flange 42 are provided with open slots 50 to receive shouldered pivot bolts 51, the cylindrical portions of which form pivotal supports for jaw holders 52 below the flange 42. The jaw holders 52 are recessed at 53 to receive shaper jaws 54, which are clamped in place in the jaw holders by jaw holder clamps 55 and clamping screws 56. The shaper jaws 54 have longitudinal V-shaped slots 57 on their top and bottom faces, which slots receive V-shaped tongues 58 and 59 in the jaw holders and jaw holder clamps. The shaper jaws may be adjusted longitudinally in the jaw holders by screws 60. The ends of the shaper jaws are tapered at 61, or otherwise properly shaped, to coöperate with the tapered ends of the tooth gage within the slot 62 in the central lower part of the shaper body 20, receiving the saw tooth between them, and with such tooth gage shape the swaged tooth in the desired form. In order to get this shaping action, an adjustable screw 65, having a lock nut 66, bears against the outer vertical face of one of the shaper jaws to adjust it around its pivotal support, while against the outer vertical face of the other shaper jaw there is the end of a screw 67 provided with an operating handle 68, the screws 65 and 67 being mounted in the internally threaded parts 69 and 70 of the main body 20.

To operate the swage shaper, it is mounted upon the saw so that the guide 48 rests upon one or more teeth and the tooth gage parts 27 and 30 bear against the back and face of another tooth, as shown in Figs. 1 and 19. The lifting handle 71, fastened by the screw 72 to the shaper body on the opposite end thereof from the operating handle 68, facilitates the setting of the swage shaper on the saw. The screw 65 being properly set, the operating handle 68 is turned and the screw 67 forces the adjacent shaper jaw toward the other one, the two shaper jaws squeezing between them and the upper and lower parts 27 and 30 of the tooth gage the swaged portion of the tooth. The tooth gage holder slides horizontally relatively to the main body 20 during this operation, if necessary. The movement of the handle 68 is limited by the engagement of the tapered ends of the shaper jaws with the tapered ends of the tooth gage parts, which engagement takes place when the tooth has been brought to proper form if the device is properly adjusted.

Either shaper jaw with its holder may be removed separately by loosening the coöperating pivot bolt 51 and removing it from the slot 50, thus allowing easy inspection and resetting. In addition, the shaper jaw bracket 40 and the shaper jaws and holders carried thereby may be removed as a unit from the shaper body, without disturbing the tooth gage or its holder, thus facilitating the adjustment of the shaper jaws relatively to each other. So also the tooth gage may be removed without disturbing the shaper jaws, and after being inspected and reset, if necessary, may be replaced to coöperate with the still properly adjusted shaper jaws.

I claim as my invention:

1. A swage shaper, comprising a shaper body, a pair of shaper jaws pivotally mounted therein to coöperate with opposite sides of a swaged saw tooth, a tooth gage holder mounted on said shaper body and freely slidable thereon transversely of the plane of the saw tooth, and a tooth gage carried by said tooth gage holder for preventing distortion of the tooth by the action of the shaper jaws.

2. A swage shaper, comprising a shaper body, a pair of shaper jaws mounted therein and movable relatively to each other, and a tooth gage movably mounted on the shaper body so that it can move relatively thereto to accommodate itself to the relative movement between the shaper jaws.

3. A swage shaper, comprising a shaper body, a pair of shaper jaws mounted therein and movable relatively to each other, a tooth gage movably mounted on the shaper body so that it can move relatively thereto to accommodate itself to the relative movement between the shaper jaws, and means for independently moving said shaper jaws relatively to said shaper body.

4. A swage shaper, comprising a shaper body, two shaper jaws mounted thereon, and a tooth gage also mounted thereon, said two shaper jaws and said tooth gage each being removable independently of the other two and said two shaper jaws being also removable as a unit independently of the tooth gage.

5. A swage shaper, comprising a shaper body, a tooth gage holder mounted on one side thereof, a unitary shaper jaw bracket mounted on the other side thereof, said tooth gage holder and said shaper jaw bracket being independently removable from said shaper body, a tooth gage carried by said tooth gage holder, and a pair of shaper jaws carried by said shaper jaw bracket.

6. A swage shaper, comprising a shaper body, a tooth gage holder mounted on one side thereof, a unitary shaper jaw bracket mounted on the other side thereof, said tooth gage holder and said shaper jaw bracket being independently removable from said shaper body, a tooth gage carried by said tooth gage holder, and a pair of shaper jaws carried by said shaper jaw bracket, said shaper jaws being carried by pivot pins mounted in open slots in the shaper jaw bracket so that the two shaper jaws are removable independently of each other.

7. A swage shaper, comprising a shaper body, a pair of shaper jaws movable relatively to each other in said shaper body, a shaper jaw holder in which each of said shaper jaws is adjustably mounted, pivotal supports for said jaw holders, said pivotal supports being carried by said shaper body, and a tooth gage carried by the shaper body and slidable relatively thereto to allow it to adjust itself automatically upon the operation of the shaper jaws.

8. A swage shaper, comprising a shaper body, a tooth gage carried thereby, a pair of shaper jaws movable relatively to each other in said shaper body, a shaper jaw holder in which each of said shaper jaws is adjustably mounted, and pivotal supports for said jaw holders, said pivotal supports being carried by said shaper body and together being removable therefrom as a unit.

9. A swage shaper, comprising a shaper body, a pair of shaper jaws movable relatively to each other in said shaper body, a shaper jaw holder in which each of said shaper jaws is mounted, pivotal supports for said jaw holders, said pivotal supports being carried by said shaper body, and a tooth gage carried by the shaper body and slidable relatively thereto to allow it to adjust itself automatically upon the operation of the shaper jaws.

10. A swage shaper, comprising a shaper body, a tooth gage carried thereby, a pair of shaper jaws movable relatively to each other in said shaper body, a shaper jaw holder in which each of said shaper jaws is mounted, and pivotal supports for said jaw holders, said pivotal supports being carried by said shaper body and together being removable therefrom as a unit.

11. A swage shaper, comprising a shaper body, a tooth gage carried thereby, a pair of shaper jaws pivotally supported on the shaper body, and means for moving said shaper jaws about their pivots relatively to the shaper body, said tooth gage being slidably mounted on said shaper body so that it can automatically accommodate itself to the movement of the shaper jaws.

12. A swage shaper, comprising a shaper body, a tooth gage carried thereby, and a pair of relatively adjustable shaper jaws pivotally supported on the shaper body and together removable therefrom as a unit.

In witness whereof, I have hereunto set my hand and seal at Mellen, Wisconsin, this 26th day of October, A. D. one thousand nine hundred and twelve.

JOHN F. PRIBNOW. [L. S.]

Witnesses:
A. W. PRIBNOW,
C. A. POUNDSTONE.

Copies of this patent may be obtained for five cents each, by addressing the "Commissioner of Patents, Washington, D. C."